United States Patent
Efraimsson et al.

(10) Patent No.: US 9,010,695 B2
(45) Date of Patent: Apr. 21, 2015

(54) CABLE SUSPENSION DEVICE

(75) Inventors: Lars Efraimsson, Falun (SE); Ulf Fridtjof Johnsen, Falun (SE)

(73) Assignee: NKT Cables Group A/S, Brondby (DK)

( * ) Notice: Subject to any disclaimer, the term of this patent is extended or adjusted under 35 U.S.C. 154(b) by 289 days.

(21) Appl. No.: 12/298,839

(22) PCT Filed: Apr. 28, 2006

(86) PCT No.: PCT/SE2006/000523
§ 371 (c)(1),
(2), (4) Date: Feb. 3, 2009

(87) PCT Pub. No.: WO2007/126349
PCT Pub. Date: Nov. 8, 2007

(65) Prior Publication Data
US 2009/0194645 A1    Aug. 6, 2009

(51) Int. Cl.
*F16L 3/00*    (2006.01)
*F16L 3/14*    (2006.01)
*H02G 7/05*    (2006.01)
*H02G 7/04*    (2006.01)

(52) U.S. Cl.
CPC . *H02G 7/04* (2013.01); *H02G 7/053* (2013.01)

(58) Field of Classification Search
USPC .............. 248/65, 58, 49–67.5; 174/40 R, 41, 174/40 TD
See application file for complete search history.

(56) References Cited

U.S. PATENT DOCUMENTS

| | | | | |
|---|---|---|---|---|
| 1,735,192 A | * | 11/1929 | Williams et al. ............. | 248/74.1 |
| 1,776,531 A | | 9/1930 | Woodruff et al. | |
| 2,914,280 A | * | 11/1959 | Mayet et al. ..................... | 248/63 |
| 4,028,899 A | * | 6/1977 | Carmichael, III ............. | 405/219 |
| 6,021,981 A | * | 2/2000 | Leebeeck ......................... | 248/58 |
| 6,448,493 B1 | * | 9/2002 | Efraimsson et al. ........ | 174/40 R |
| 6,666,415 B2 | * | 12/2003 | Hansen ......................... | 248/74.3 |
| 7,207,530 B2 | * | 4/2007 | Ismert et al. .................. | 248/74.4 |
| 2001/0008265 A1 | * | 7/2001 | Hauer ........................... | 248/74.2 |
| 2003/0094547 A1 | * | 5/2003 | Wilkinson, III .............. | 248/74.1 |
| 2003/0191468 A1 | * | 10/2003 | Hoffman et al. ................ | 606/59 |
| 2009/0152409 A1 | * | 6/2009 | Lutzhoft et al. .............. | 248/68.1 |

FOREIGN PATENT DOCUMENTS

| | | |
|---|---|---|
| EP | 1453169 A1 | 1/2004 |
| FR | 2430116 A1 | 1/1980 |
| WO | WO 94/26012 A1 | 11/1994 |

* cited by examiner

*Primary Examiner* — Christopher Garft
(74) *Attorney, Agent, or Firm* — Buchanan Ingersoll & Rooney PC

(57) ABSTRACT

The present invention relates to problems how to keep cable arrangement functional, or at least make the damage as little as possible, after being exposed to different types of mechanical overloads. The problems are solved by methods and arrangements in which the securing means and the contact material of the securing means are arranged so that the cable can slide through the securing means when it is exposed to mechanical overloads.

27 Claims, 4 Drawing Sheets

CABLE SUSPENSION DEVICE

FIELD OF INVENTION

The present invention relates to a cable suspension device. In more detail a cable suspension device adapted to reduce the effects of mechanical overload on a cable suspension system.

BACKGROUND OF THE INVENTION

One common way to route a cable, e.g. cables for electrical power, in a landscape is to hang them between poles. The cables, such as self-supporting overhead cables, cables reinforced with helically wound reinforcements, transmission lines, etc., are normally secured to the poles with the aid of suspension devices.

One problem with this arrangement is that it is exposed to e.g. falling trees. This could heavily damage the arrangement and might, as a consequence of the damage, cause interruptions in the functions of the cable system. Repair of the system and interruptions, e.g. in electricity supply, can be very costly.

One feature of the cable suspension arrangement is that it should be resistant to different circumstances that can affect the system, e.g. weather and falling air-planes. Heavy wind or snowfall can cause trees to fall down on the arrangement and cause mechanical overloads. The cable suspension arrangement should also be easy to mount or repair in a short period of time and be cost-effective. It is desirable to have a cable suspension arrangement that will eliminate the need of repair, and when repair is necessary, make the repair cost-effective with minimal use of tools and spare parts.

One way to solve the problem with falling trees is so make broad roads where the cable is hanging, by cutting down all the trees around it. If possible at all, it is very costly and it does not solve the problem if an air-plane crash on the arrangement.

The French patent application no 2798 783 describes a cable suspension device that will detach the cable when it is exposed to mechanical overload. This causes the cable to fall down on the ground. To repair, it will be necessary to have advanced tools for putting the cable up on the pole again. This could be costly. It could also be so that the function of the cable arrangement must be cut if the cable is situated on the ground, e.g. for security reasons. It is also very critical to have the right configuration of the cable suspension device so that the cable detach at the right moment.

SUMMARY OF THE INVENTION

The present invention relates to problems how to keep cable arrangement functional, or at least make the damage as little as possible, after being exposed to different types of mechanical overloads.

The problems are solved by methods and arrangements which let a secured cable have the possibility to slide through the cable securing means used for fixing the cable to e.g. a pole.

In more detail the problems are solved by methods and arrangements in which the securing means and the contact material of the securing means are arranged so that the cable can slide through the securing means when it is exposed to mechanical overloads.

According to the invention the problems are solved by arrangements and methods according to the claims. Further embodiments can be found in the independent claims.

One major advantage of the invention is that the cable can take a lot of mechanical load before anything brakes and the cable fall down on the ground. The cable can be exposed to heavier mechanical force than with other solutions before it is out of function.

Another advantage is that the pressure acting on the cable is reduced so that it will not permanently deform the cable.

Another advantage is that the function of the cable suspension device is not very little dependant of the form and material of a secured cable.

Another advantage is that even if the cable or the cable suspension devices need some repair or adjustment it is not critical to be fast, the system will still work without any risk of danger on the surroundings.

Another advantage is that the maintenance of the system is simple and cost effective.

The invention will now be described more in detail with the aid of preferred embodiments in connection with the enclosed drawings.

DESCRIPTION OF PREFERRED EMBODIMENTS

Figure 1A:
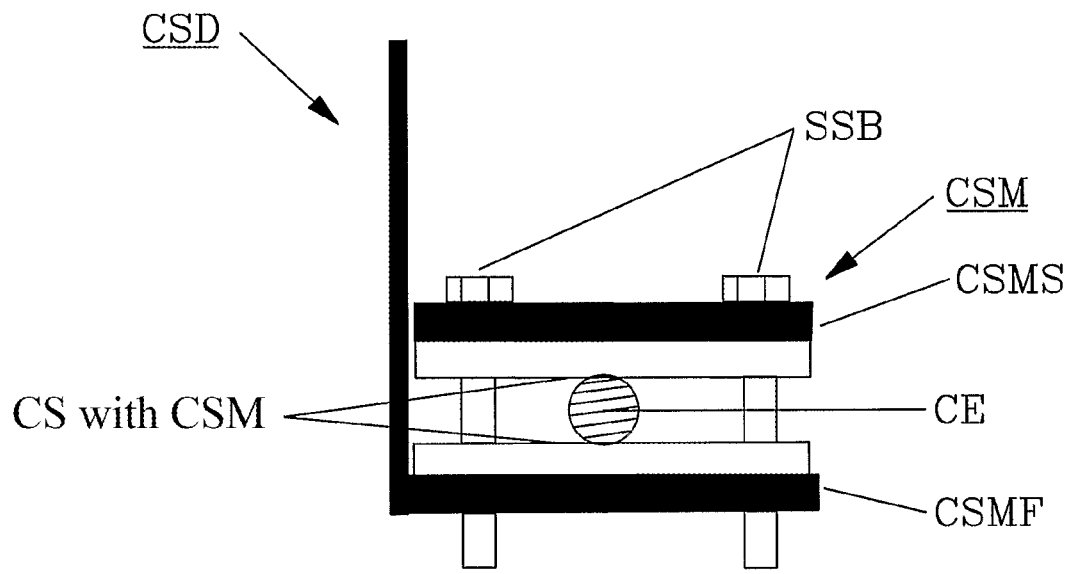
FIGS. 1a and 1b illustrates a first embodiment of a cable suspension device.
Figure 1B:
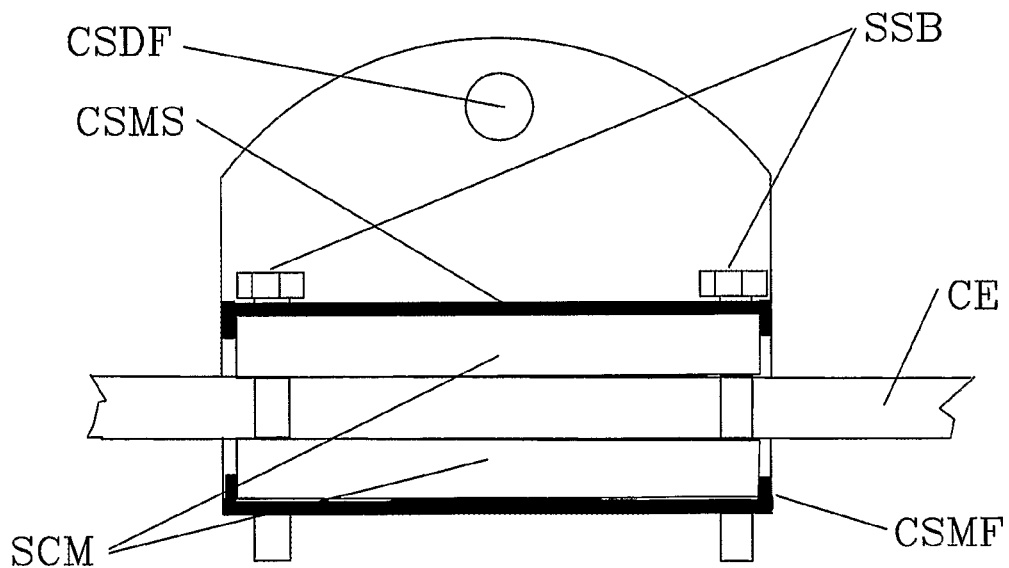

FIGS. 1a and 1b illustrates a first embodiment of a cable suspension device CSD comprising cable securing means CSM and a cable suspension device fastening means CSDF. The CSD could be mounted on e.g. a pole and a cable CE could be secured in the securing means CSM.

The CSM comprises a first part CSMF and a second part CSMS suitable for securing a cable CE between them when brought together into a closed state. They can be hold together by e.g. bolts, hinges, springs or similar arrangements. In this case four bolts SSB keep CSMF and CSMS together. The CSMF and the CSDF is integrated in this embodiment.

The CSM comprise a contact surface CS. A cable is secured by being in contact with the contact surface CS comprising the contact material SCM.

The cable suspension fastening means CSDF is in this particular embodiment a hole at the top for hanging the CSD in a hook on e.g. a pole. The CSD can swing around the hook.

Other types of fastening means are of course possible. It could e.g. be fixed mounted to a pole or integrated in the pole.

It is however an advantage if the cable suspension device, or at least the CSM, have the possibility to swing. This will reduce the bending force on the cable when e.g. a tree falls down. The contact surfaces CS, between the CSM and a secured cable CE, is able to automatically position itself better along the line followed by the cable in the proximity of a pole. As a result, less bending stresses will be applied to the cable, and the contact surface CS can be utilised optimally. This results in a low mean value of the mechanical stresses and strains on the cable, since the whole of said surface is constantly used.

The cable securing means CSM could also be shaped so that the contact surface CS substantially follows the line of a secured cable CE. This could be a straight line or a line curvature in the proximity of a pole.

The CSM is configured so that a cable secured in the CSM can slide through it if it is exposed to mechanical overload, e.g. if a tree falls on the cable between two poles. This has the effect that the system can take heavier load before anything breaks. Furthermore, if a mounted cable slides through the CSM, the angel between the cable CE and the pole will decrease and the force on the system will be less.

A secured cable will slide on the contact material SCM when exposed to a mechanical overload. The SCM must therefore allow the cable to slide on it. The coefficient of friction between a secured cable and the contact surface CS, SCM could be between 0.1-0.6, preferable between 0.2-0.4.

It is an advantage if the SCM is elastic so the contact surface CS could adapt to the shape of the cable. This will keep the pressure on the cable CE on a substantial constant level. Another advantage is that the pressure acting on the cable is reduced so that it will not permanently deform the cable. Furthermore, the CS could change its form when the cable is sliding on it. This is an extra advantage if the cable is not circular or symmetric.

The SCM should preferably be softer than the material used for the secured cable, e.g. Thermoplastic Elastomers (TPE), thermoplastic rubber, rubber, Styrene Butadiene Styrene (SBS), Styrene Ethylene Butylene Styrene (SEBS), Ethylene Vinyl Acetate (EVA), Ethylene Butyl Acetate (EBA), Sylomer, sylodyn, Nitrile Butadiene Rubber (NBR), Styrene Butadiene Rubber SBR or silicone. The elasticity module of the SCM material should preferably be between 40-500 MPA. A secured cable should preferably have an elasticity module between 170-1200 MPA in the polymeric material.

Figure 5:
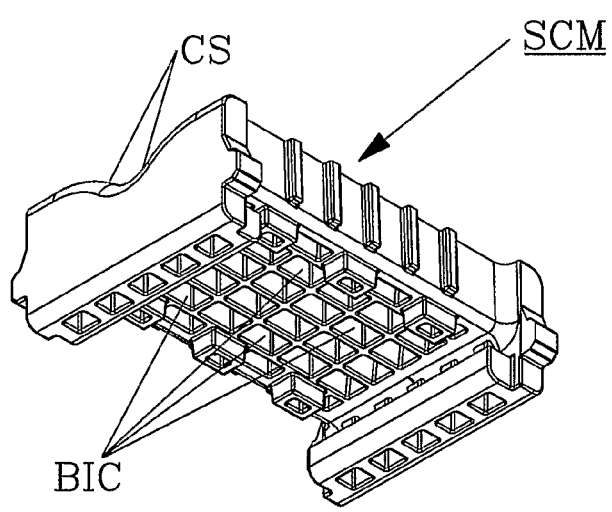
FIG. 5 illustrate details of the contact material in the cable securing means

FIG. 5 illustrates a surface contact material SCM. It is and advantage if the SCM is foamed or foamed like, e.g. by having build-in cavities BIC. By using BIC it will be possible to make the material itself harder. A harder material makes it easier to attach the SCM to the CSM, CSMF and the CSMS in a resistant way. Softer material will easily deform when a secured cable is exposed to force. BIC also have the advantage that their size and form can be adapted to different parts of the SCM. There could e.g. be no BIC where the material is attached to the CSM and thereby make the fastening points stronger. The BIC is also easier and cheaper to produce than foamed material. A foamed or foamed like material also make the material adaptable to different types of cable. The sliding force between the material and a sliding cable is very little dependant on the dimension and form of the cable.

If the cable has been exposed to mechanical overload and it has changed its position in the securing means CSM it is an easy operation to put it back in the right position again. The CSM can be opened up and the cable could be put in the right position. After putting the cable CE in its position, the cable CE can be secured by closing the CSM. The cable need never to be released from the suspension device.

Embodiment 2

Figure 2:
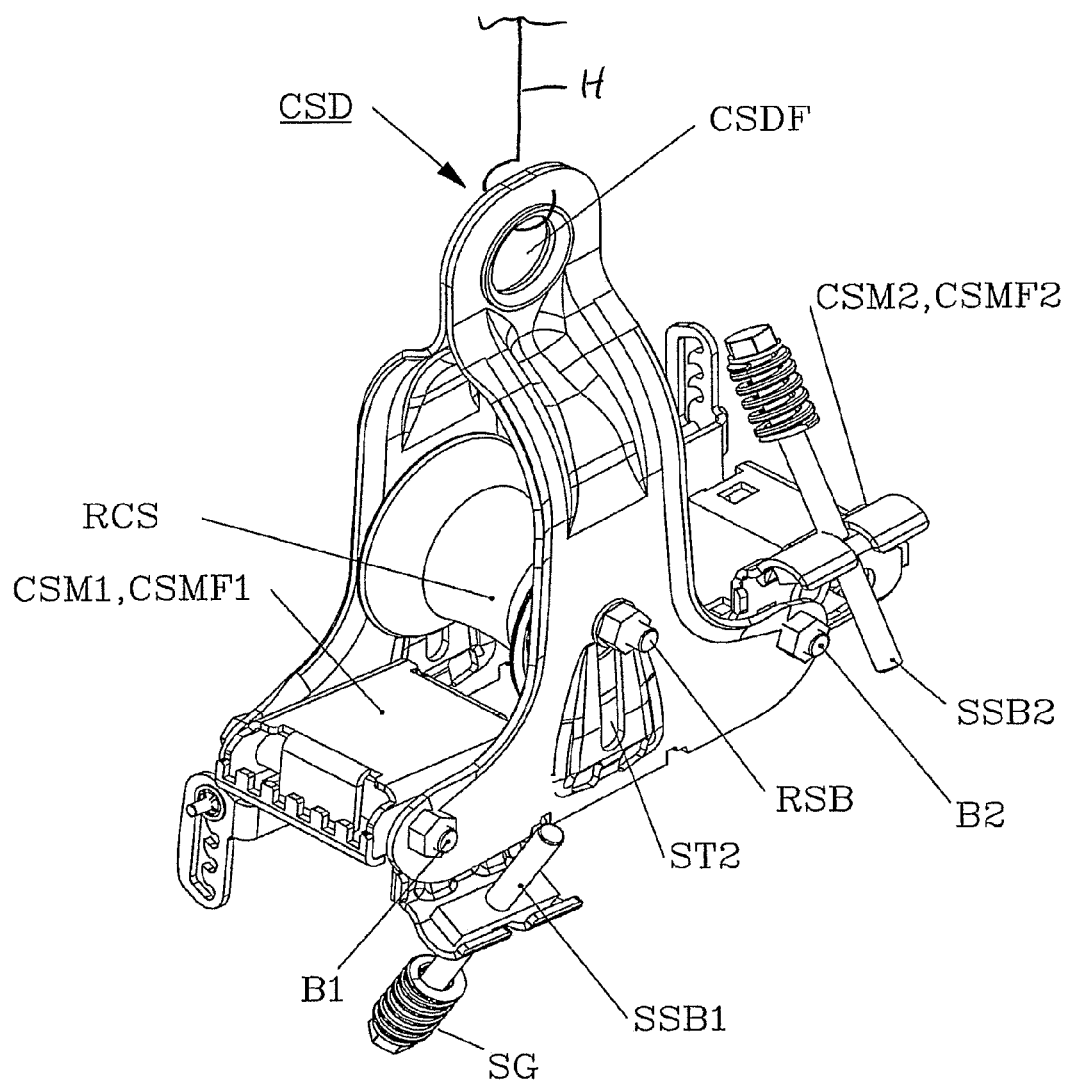
FIG. 2 illustrates a second embodiment of a cable suspension device comprising two cable securing means.

FIG. 2 illustrates a cable suspension device CSD comprising two cable securing means CSM1, CSM2. The CSD could be mounted on e.g. a pole and a cable could be secured in the two securing means CSM1 and CSM2. In this particular embodiment there are two cable securing means, CSM1 and CSM2, but it could be possible to have only one or more than two. In FIG. 2 the first parts CSMF1, CSMF2 of the CSM1 and CSM2 is illustrated. The second parts of CSM1 and CSM2, CSMS1 and CSMS2, which can be seen in the detailed illustration of FIG. 3, is not illustrated in FIG. 2.

To make it easier to put a cable in place the CSM1 and CSM2 can be turned around the bolt B1, B2. This is illustrated in FIG. 2 where the CSM1, CSMF1 is hanging upside down compared to CSM2, CSMF2. When a cable is put into the CSD the two cable securing means have the position of CSM1 in FIG. 1, hanging upside down. After the cable is in place, CSM1, and CSM2 are turned around and a second part CSMS1, CSMS2, as can been seen in FIGS. 3a and 3b, of the cable securing means is attached, and the cable is secured by the securing screw bolt SSB1, SSB2. There are of course several possibilities to make it easier to put a cable into the CSD. This is only one example.

The cable suspension device has fastening means CSDF, in this case a hole at the top for hanging the CSD in a hook H on e.g. a pole. The CSD can swing around the hook. Other types of fastening means are of course possible. It could e.g. be fixed mounted to a pole or integrated in the pole.

In this particular embodiment with two cable securing means, CSM1 and CSM2 are each one pivotably mounted on the CSD around a bolt B1, B2.

FIG. 2 also illustrates, a rotable cable support RCS that forms a part of a cable carriage function in the suspension device. This has the function of making it easy to put the cable into the CSD. It has the form of a roller or wheel centred on a bolt RSB, having enlarged end regions that enable the cable to be centred in the suspension device when pulling the cable into and out of said device, in addition to a cable supportive function. It is possible to move the rotable support RCS away from the cable after having drawn the cable into or out of said cable suspension device CSD, so that the cable is able to rest on the cable securing means CSM1, CSM2. The rotable support RCS is moved away from the cable by loosing the bolt RSB and let the bolt slide through the slot ST2.

Figure 3A:
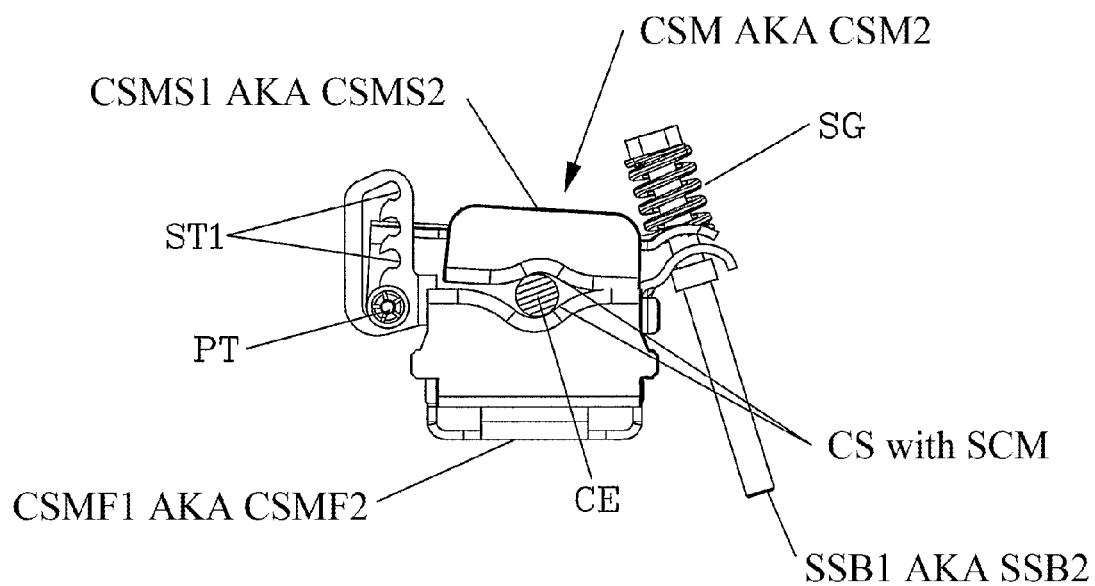
FIGS. 3a and 3b illustrates a cable securing means
Figure 3B:
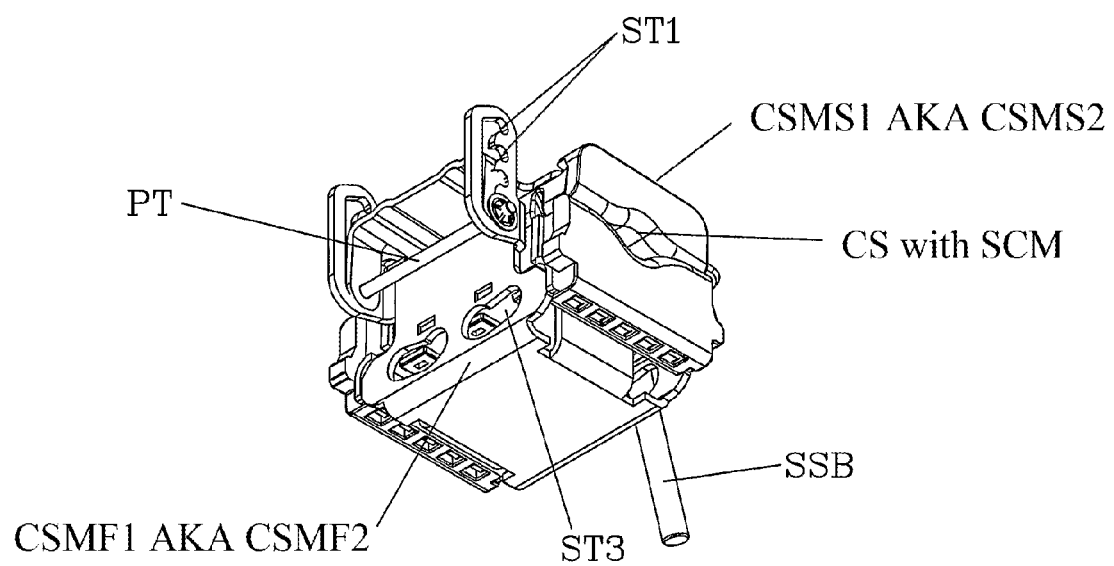

FIGS. 3a, 3b illustrates a cable securing means CSM1, CSM2 in detail. This is one example and other possibilities are of course possible. In FIG. 3a a secured cable CE is illustrated. In order to enable the cable to be secured in the suspension device and to easily put it in and out of the CSM1 and CSM2, the CSM1 and CSM2 consist of a first part CSMF1, CSMf2 and a second part CSMS1, CSMF2. These are pivotally connected and can be secured to each other by a securing screw bolt SSB1, SSB2. The second part CSMS1, CSMS2 can be attached to the first part CSMF1, CSMF2 in different positions. In this embodiment by having different slots ST1 for attaching a pivot PT, see also FIG. 4. This is to make it possible to adapt the CSM1 and CSM2 to different kinds of cables, especially if they have different dimensions. All kind of securing means are of course possible, several bolts, with or without hangings, one or several parts in different material etc. as long as there is a contact surface CS that can hold a cable in position. A cable is secured by being in contact with the contact surface CS comprising the contact material SCM.

Figure 4:
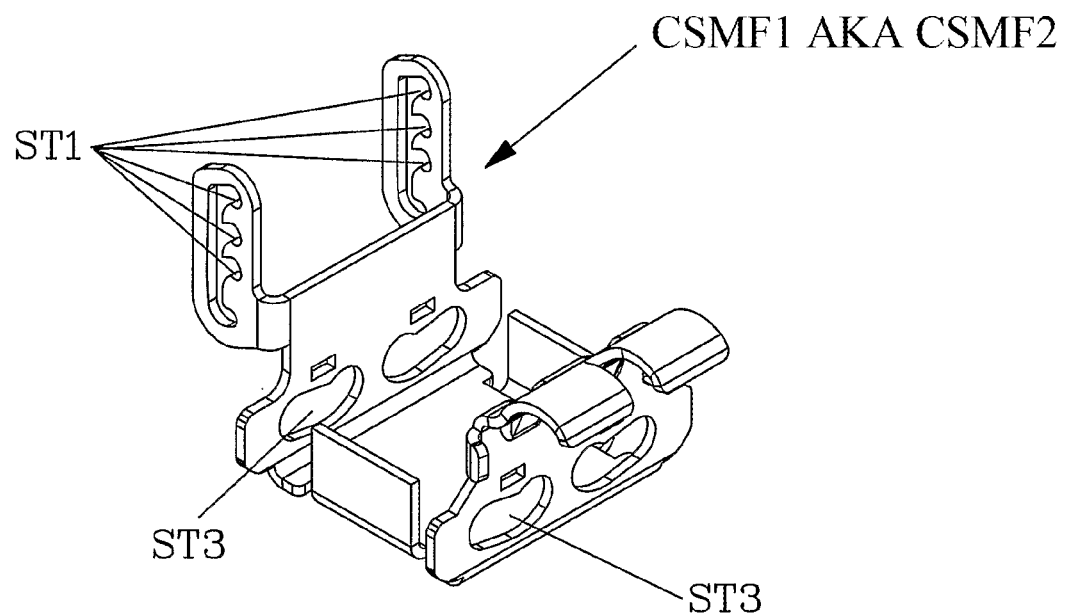
FIG. 4 illustrate details of a cable securing means

FIG. 4 illustrates the first part of the cable securing means CSMF1, CSMF2 without the contact surface CS and the contact material SCM. The CSMF1 is pivotally mounted on the CSD around a bolt B1, B2. B1 and B2 passes through the CSM1, CSM2 by a hole ST3, FIGS. 3b and 4.

Apart from that the CSM1 and CSM2 are pivotably mounted, they are also movable mounted. The hole ST3, FIG. 3b and 4, is made like a slot, and the bolt B1, B2 is mounted so that the CSM1 and CSM2 can move by sliding in the slot ST3.

As a result of the pivotal suspension of the CSM1 and CSM2, the two contact surfaces CS, between the CSM1, CSM2 and a secured cable CE, are able to position themselves automatically along the line followed by the cable in said device. This could be a straight line or a line curvature in the proximity of a pole, e.g. if a tree fall onto the cable and cause the cable to bend. As a result, no additional bending stresses will be applied to the cable, and the contact surface CS can be utilised optimally. This results in a low mean value of the mechanical stresses and strains on the cable, since the whole of said surface is constantly used. If the CSD is mounted on a hook and thereby can swing around it, like in this particular embodiment, it could be possible to have only one of the CSM1, CSM2 pivotably mounted on the CSD, and still have the effect of that the two cable securing means CSM1, CSM2, and thereby the contact surfaces CS, positioning themselves in line with a secured cable CE.

A cable secured in the CSM1 and CSM2 can slide if it is exposed to mechanical overload. This has the effect of that the system can take heavier load before anything breaks. If a mounted cable slides through CSM1 and CSM2, e.g. if a tree falls on the cable between two poles, the angel between the cable CE and the pole will also decrease and the force on the system will be less. If the CSM1 and CSM2 are pivotally mounted, like in this embodiment, the system can take even heavier load before anything breaks down.

The CSM1 an CSM2 are, in this particular embodiment, also movably mounted. The CSM1 and CSM2 should be pushed towards or away from each other when a cable is secured. If a secured cable CE is exposed to a force, one of the cable securing means CSM1, CSM2 will move in the slot ST3 before it reaches its endpoint and the cable will start to slide on the surface CS. This means that the cable will start to slide in one of the cable securing means before it start to slides in the other. This has the effect that the start force is less than if the CSM1, CSM2 have been fixed and thereby reduces the maximum force on the system when the cable is exposed to mechanical overload.

Another solution to achieve the same effect is that e.g. CSM1 is fixed to the CSD, and CSM2 can slide in the slot ST2 in two directions. This has the effect that the cable will slide in the cable securing means CSM1 before it slides through the other cable securing means. It could be possible do configure the both cable securing means different to make the friction forces different and thereby reduce the start force even more.

FIG. 5 illustrates the contact surface material SCM. The contact surface CS is made of a contact material SCM, integrated into the cable securing means CSM1, CSM2. The SCM of FIG. 5 will fit into the first part of the cable securing means CSMF1, CSMF2 of FIG. 4. A correspondent SCM will be fit into the second part CSMS of the cable securing means CSM1 CSM2.

A secured cable will slide on the SCM when exposed to a mechanical overload and thereby decreasing the damage on the system. The SCM must therefore allow the cable to slide on it. The coefficient of friction between a secured cable CE and the contact surface CS, SCM could be between 0.1-0.6, preferable between 0.2-0.4.

It is an advantage if the SCM is elastic so the surface CS could adapt to the shape of the cable. This will keep the pressure on the cable CE on a substantial constant level. Another advantage is that the pressure acting on the cable is reduced so that it will not permanently deform the cable. Furthermore, the CS could change its form when the cable is sliding on it. This is an extra advantage if the cable is not circular or symmetric.

The SCM should preferably be softer than the material used for the secured cable, e.g. TPE, thermoplastic rubber, rubber, SBS, SEBS, EVA, EBA, Sylomer, sylodyn, NBR, SBR or silicone. The elasticity module of the SCM material should preferably be between 40-500 MPA. A secured cable should preferably have an elasticity module between 170-1200 MPA in the polymeric material.

The SCM should be foamed or foamed like, e.g. by having build-in cavities BIC. By using BIC it will be possible to make the material itself harder. A harder material makes it easier to attach the SCM to the CSM1, CSM2, CSMF1, CSMF2, CSMS1, CSMF2 in a resistant way. Softer material will easily deform when a secured cable is exposed to force. BIC also have the advantage that there size and form can be adapted to different parts of the SCM. There could e.g. be no BIC where the material is attached to the CSM and thereby make the fastening points stronger. The BIC is also easier and cheaper to produce than foamed material. A foamed or foamed like material also make the material adaptable to different types of cable. The sliding force between the material and a sliding cable is very little dependant on the dimension and form of the cable.

The form of the material SCM will change after being exposed to pressure. To keep the securing force on the first CSMF1, CSMF2 and the second CSMS1, CSMS2 parts of the CSM1, CSM2 on a substantial stable level, a helical spring SG is mounted around the securing screw bolt SSB1, SSB2. When the SCM change its form, the spring will expand and pressure the first SCMF and the second part SCMS towards each other. Other solutions with different kind of springs are of course possible, e.g. using torsion springs. The spring SG could be configurated so that the pressure on a secured cable is on the appropriate level. Then it will be no need for controlling the momentum of which the bolt SSB is secured.

If the cable has been exposed to mechanical overload and it has changed its position in the securing means CSM1, CSM2 it is an easy operation to put it back in the right position again. The CSM1, CSM2 can be opened up and the cable could be put in the right position. If necessary the rotable cable support RCS could be used by temporary putting in its upper position so that the device can be used as a cable carriage. After putting the cable CE in its position, the cable CE can be secured by closing the CSM1, CSM2. The cable need never to be released from the suspension device.

The invention is of course not limited to the above described and in the drawings shown embodiments but can be modified within the scope of the enclosed claims.

The invention claimed is:
1. A cable suspension device, comprising:
at least one cable securing device, the cable securing device comprising:
a first part and a second part that secures a cable between the first part and the second part when brought together into a closed state, and
an adjustable spring-biased fastener that holds the first part and the second part of the cable securing device together in the closed state;
a respective contact surface, attached to each of the first part and the second part, wherein:
the contact surfaces comprise an elastically adaptable contact material having built-in cavities which are adapted so as to enable the contact surfaces to elastically adapt to a shape of the secured cable, and
the adjustable spring-biased fastener is adapted so as to include an adjustment range that enables the first and second parts to be secured together with enough pressure to prevent slippage of the secured cable under normal loads and enables the secured cable to slide though the cable securing device only when the secured cable is exposed to a mechanical overload.

2. A device according to claim 1 where the cable suspension device further includes a fastener comprising a hole suitable for hanging the cable suspension device on a hook.

3. A device according to claim 1 where the contact material comprises polymeric material.

4. A device according to claim 1 where the contact material of the cable securing device has a elasticity module between 40 and 500 MPA.

5. A device according to claim 1 where the contact material is configured so that the coefficient of friction between the contact material of the cable securing device and a secured cable is between 0.2 and 0.4.

6. A device according to claim 1, where the first and the second part of the cable securing device are pivotally connected to each other.

7. A device according to claim 6 where the first and the second part of the cable securing device is be pivotally connected in at least two different positions for making it possible to adapt the securing device to different physics of a secured cable.

8. A device according to claim 6, where the first and second part of the cable securing device are held together by at least one securing screw bolt.

9. A device according to claim 1 where the adjustable spring-biased fastener of the cable securing device comprises at least one spring suitable for applying a cable securing force on the first and second part of the cable securing device.

10. A device according to claim 9, wherein the at least one spring is helical.

11. A device according to claim 10 where said at least one spring is mounted around a securing screw bolt.

12. A device according to claim 1 comprising two cable securing devices of which at least one is pivotably mounted on the cable suspension device.

13. A device according to claim 12 where both of the cable securing devices are pivotably mounted to the cable suspension device.

14. A device according to claim 12, wherein at least one of the cable securing devices is mounted to the cable suspension device to be slidingly movable.

15. A device according to claim 14 where both of the cable securing devices are connected to the cable suspension device to be slidingly movable.

16. A device according to claim 1 where the cable suspension device further comprises a rotatable cable supporting means which enables a cable resting thereon to be drawn forwards in said suspension device.

17. A device according to claim 16 where the rotatable cable supporting means is movable for making it possible to detach it from a cable resting thereon.

18. A method for securing a cable to a pole, the method comprising:
attaching a cable suspension device to an attachment point using a cable suspension device fastener, wherein the cable suspension device includes a cable securing device that includes:
a first part and a second part that secures the cable between the first part and the second part when the first part and the second part are brought together into a closed state,
an adjustable spring-biased fastener that holds the first part and the second part of the cable securing device together in the closed state; and
a respective contact surface, attached to each of the first part and the second part, wherein the contact surfaces include an elastically adaptable material having built-in cavities;
securing the cable into the cable securing device, wherein the cable is secured into the cable securing device by bringing the first part and the second part of the cable securing device together into the closed state;
adapting a shape of the contact surfaces to the cable by means of the elastically adaptable material having built-in cavities; and
applying a pressure with the adjustable spring-biased fastener to secure the cable to prevent slippage of the secured cable under normal loads and enables the secured cable to slide through the cable securing device only when the secured cable is exposed to a mechanical overload.

19. A method according to claim 18 wherein the attaching step includes hanging the cable suspension device on a hook that penetrates a hole in the cable suspension device.

20. A method according to claim 18 comprising the step of: configuring the properties of the contact material of the cable securing device so that it has a elasticity module between 40 and 500 MPA.

21. A method according to claim 18 comprising the step of: configuring the properties of the contact material of the cable securing device so that the coefficient of friction between the contact material of the cable securing device and the secured cable is between 0.2 and 0.4.

22. A method according to claim 18 comprising the step of: securing a cable into a cable suspension device by securing it in two cable securing devices; and mounting at least one of the cable securing devices pivotably.

23. A method according to claim 22 comprising the step of: mounting the two cable securing devices of the cable suspension device pivotably.

24. A method according to claim 23 comprising the step of: mounting at least one of the cable securing devices of the cable suspension device to be slidingly movable.

25. A method according to claim 24 comprising the step of mounting the two cable securing devices of the cable suspension device to be slidingly movable.

26. The cable suspension device according to claim 1, wherein the coefficient of friction between contact surface and the secured cable is between 0.1-0.6.

27. The method according to claim 18, wherein the coefficient of friction between the contact surface and the secured cable is between 0.1-0.6.

* * * * *